United States Patent [19]

Penner

[11] 4,271,562
[45] Jun. 9, 1981

[54] FISH SCALER
[76] Inventor: Nicholas Penner, Box 37, Teulon, Manitoba, Canada
[21] Appl. No.: 101,833
[22] Filed: Dec. 10, 1979
[30] Foreign Application Priority Data
Dec. 18, 1979 [CA] Canada .................................. 318164
[51] Int. Cl.³ ............................................ A22C 25/02
[52] U.S. Cl. ......................................... 17/67; 17/18; 30/117
[58] Field of Search ......................... 17/66, 67, 18, 64; 30/117; 145/33 A

[56] References Cited
U.S. PATENT DOCUMENTS

| | | | |
|---|---|---|---|
| 990,839 | 5/1911 | Coffron | 145/33 R |
| 1,540,246 | 6/1925 | Blassie | 30/117 |
| 2,449,753 | 9/1948 | Sawyer | 17/67 |
| 2,847,845 | 8/1958 | Frank et al. | 30/117 X |
| 4,063,332 | 12/1977 | McCullough | 17/67 X |

Primary Examiner—Willie G. Abercrombie
Attorney, Agent, or Firm—Stanley G. Ade

[57] ABSTRACT

A plurality of stainless steel wires or blades extend between cylindrical end elements on a spindle and may be stressed as desired to place them under tension. The wires or blades may be straight, that is parallel to the longitudinal axis of the spindle or spiralled relative thereto, as desired. The device may be rotated by a conventional electric drill or if electrical power is not available, by a power take-off from any engine such as a stationary engine, marine engine, automobile engine or the like, via a flexible drive cable. The device scales fish with the minimum of damage to the fish and with relative safety to the operator.

8 Claims, 10 Drawing Figures

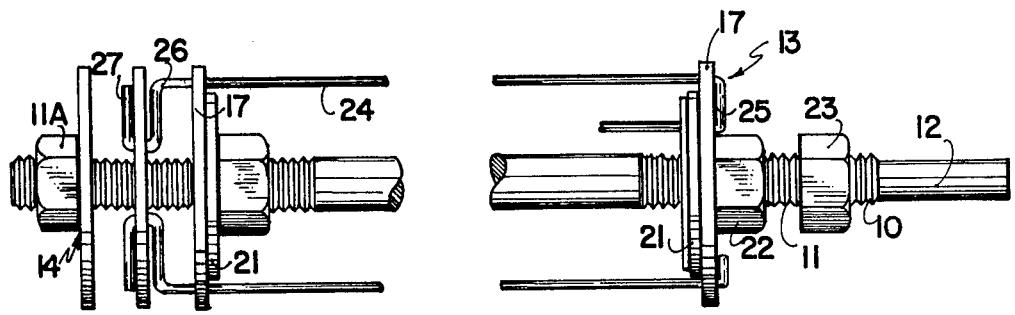
FIG. 4
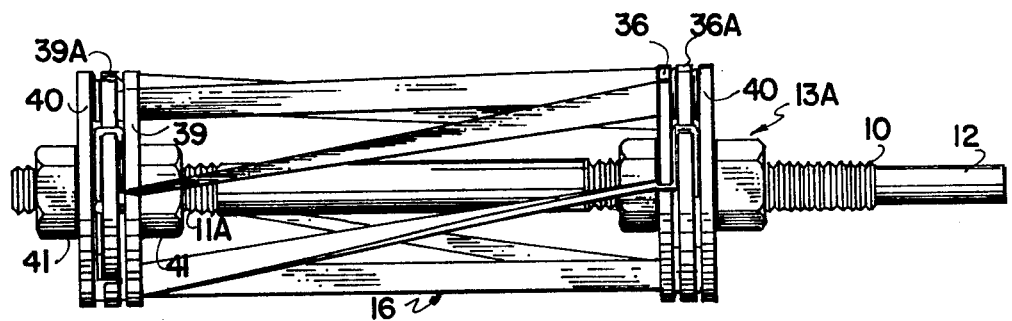
FIG. 5
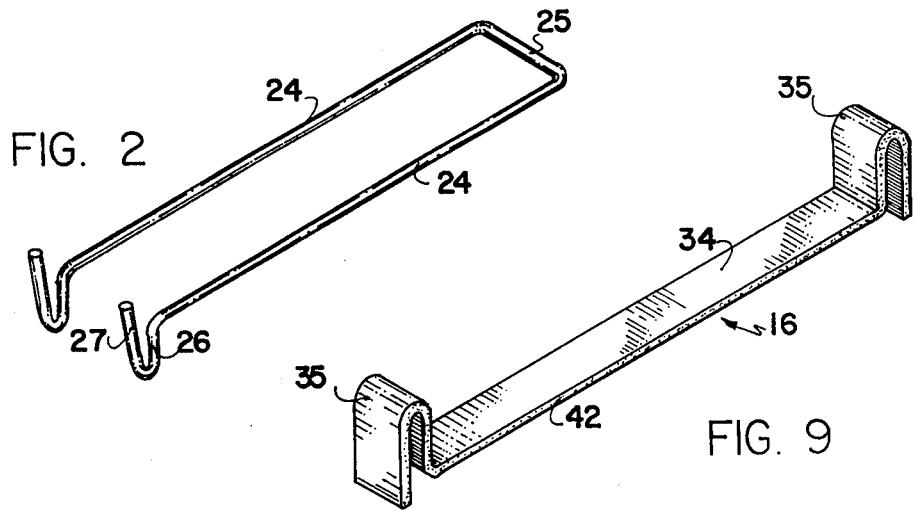
FIG. 2
FIG. 9

FISH SCALER

BACKGROUND OF THE INVENTION

This invention relates to new and useful improvements in fish scaling devices.

In particular, it relates to power driven fish scalers of the type adapted to be held manually and moved over the surface of a fish which is being scaled.

Previously, it has been customary to scale fish with a scaling device having a power driven rotated head equipped with a series of blades either spiral or straight or equipped with a multiplicity of lugs projecting radially from a cylindrical surface of a head.

In the latter case, the lugs may be ground on the outermost edges to provide cutting edges and in case of blades, the blades are also in the nature of cutters being angulated to the direction of rotation so that a cutting action is accomplished.

The majority of these devices often damage the fleshy surface of the fish, particularly when same is broken, so that it becomes torn when the scaler is moved over the broken surface. The blades or cutting lugs catch under the skin and often rip the skin and flesh to an extent rendering it practically useless.

This is because the prior art devices include blades or lugs which are rigid and non-yielding and furthermore the blades or lugs often become dull after an extended period of use and unless re-ground periodically, the efficiency of the device decreases.

Attempts have been made to overcome these disadvantages and one such example is shown in U.S. Pat. No. 2,449,753—J. F. Sawyer—dated Sept. 21, 1948.

In this particular patent, a plurality of wires extend between multi-fingered discs which are fixed to a drive shaft and the resiliency of the discs applies a certain tension to the wires. However, this particular device suffers from several disadvantages. Firstly, there is no control over the tension in the wires, said tension being provided solely by the tension of the multi-fingered discs which are fixed.

Secondly, no means is provided to vary the lie of the wires which, in the example shown, are straight or in other words parallel to the longitudinal axis of the spindle and it is desirable, under certain circumstances, to spiral these wires particularly when using same on coarse fish or fish with relatively large or tough scales.

SUMMARY OF THE INVENTION

The present invention overcomes these disadvantages and one aspect of the invention consists of a fish scaler comprising a drive spindle attachable to a source of power, for rotation; comprising in combination a pair of spaced apart anchor members on said spindle, a plurality of scaling elements extending between and held by said anchor elements in cylindrical array and screw threaded means co-operating between at least one of said anchor elements and said spindle to move said anchor element legnthwise on said spindle, relative to the other of said anchor elements, thereby controlling the tension in said scaling elements at least one end of said scaling element including a double angulated end portion having an inner angulated portion extending substantially at right angles to said scaling element. An outer angulated portion extends from the end of said inner angulated portion in substantially spaced and parallel relationship thereto, to form a substantially U-shaped end engaging one of said anchor elements. The anchor element engaged by said outer angulated portion includes a centrally apertured holding disc freely engaging over said spindle and means are provided in said holding disc to receive said angulated portion of said scaling element whereby said inner angulated portion engages upon one side of said disc and the outer angulated portion engages upon the other side of said disc. A further centrally apertured disc freely engages said spindle on the inner side of said holding disc and against said inner angulated portion. The scaling elements engage through said further disc and a centrally apertured clamping disc freely engages the spindle on the outer side of said holding disc and engages the outer angulated portions. Means cooperate with the spindle upon either side of the discs in order to clamp the discs together and hence clamp said inner and outer angulated portions between said holding disc and said further disc and between said holding disc and said clamping disc, respectively.

A further advantage of the present invention is to provide means whereby the scaling elements may lie parallel to the longitudinal axis or straight or may be spiralled in either direction relative to the longitudinal axis to a greater or lesser extent as desired.

Another advantage of the present device is to provide a fish scaler in which the tension of the scaling element may be adjusted, within limits, to suit the source of power and the type of fish being scaled.

Another advantage of the present invention is that the scaling elements either consist of wires under tension or, alternatively, blades situated radially or edgewise, once again depending upon the characteristics desired.

A still further advantage of the present invention resides in the fact that easy replacement of individual wires or blades may be accomplished.

Still another advantage of the present invention is to provide a device of the character herewithin described, which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the preferred embodiment of the principles of the present invention, in which:

DESCRIPTION OF THE DRAWINGS

FIG. 2 is an isometric view of one of the elements per se.

FIG. 4 is a view similar to FIG. 1, but showing the parts expanded for clarity.

FIG. 5 is a side elevation of the device showing blades incorporated rather than wires.

FIG. 9 is an isometric view of one of the blades used in FIG. 5.

In the drawings like characters of reference indicate corresponding parts in the different figures.

DETAILED DESCRIPTION

Figure 1:
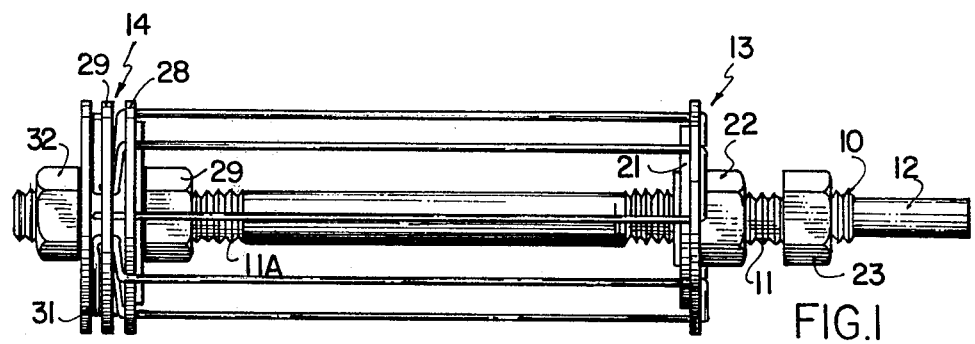
FIG. 1 is a side elevation of the device showing one embodiment thereof.
Figure 6:
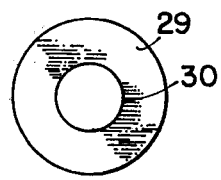
FIG. 6 is a front elevation of the holding disc of FIG. 1.
Figure 7:
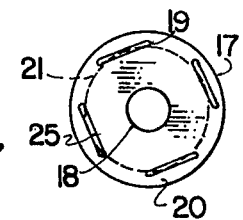
FIG. 7 is a front elevation of the right hand anchor disc of FIG. 1.

Proceeding therefore to describe the invention in detail, reference to the accompanying drawings shows the provision of an elongated cylindrical spindle 10 having screw threaded parts 11, 11A formed thereon and, if desired, reduced at the inner end 12 thereof so that it may be held within a conventional electric drill. Alternatively, the end 12 may be secured to a flexible drive cable (not illustrated).

The spindle may be rotated by the aforementioned electrical drill if electrical power is available, or by the flexible shaft which may be operatively connected to any form of engine such as a stationary engine, marine engine, autombile engine or the like. However, as such devices are well known, it is not believed necessary to illustrate and describe same.

An inner anchor member collectively designated 13 is provided on the screw threaded portion 11 and a distal anchor member collectively designated 14, is provided on the screw threaded portion 11A of the spindle.

A plurality of scaling elements collectively designated 15 are provided in the embodiment illustrated in FIGS. 1 to 4 and a plurality of scaling elements in the form of blades collectively designated 16, illustrated in FIGS. 5 and 9.

Dealing first with the embodiments illustrated in FIGS. 1 to 4, the anchor member 13 illustrated in FIG. 1, consists of a disc 17 apertured centrally as at 18 to engage over the spindle 10, said disc being provided with a plurality of apertures or drillings 19 therethrough, situated adjacent the periphery 20 thereof. In order to provide stiffness to this disc 17, a backing plate 21 may be provided, the diameter of said backing plate being slightly less than the diameter circumscribed by the apertures or drillings 19 and this backing plate is provided with a nut or screw threaded element 22 welded or otherwise secured thereto and extending upon one side thereof. This backing plate, together with nut 22, is screw threaded onto the portion 11 of the spindle 10 whereupon the disc 17 is engaged over the inner end of spindle 10 and over nut 22 to engage against the backing plate 21.

A further nut or screw threaded element 33 is then engaged over the screw threaded portion 11 and acts as a lock nut against the nut 22 thus securing the anchor member 13 in the desired position along the screw threaded portion 11 of the spindle.

The scaling elements 15 used in this particular embodiment, are preferable formed of stainless steel wire of approximately 14 gauge, each length of stainless steel wire being formed to provide a pair of spaced and parallel arms 24 extending from a transverse cross piece 25 as clearly shown in FIG. 2. The distal ends of the arms 24 are angulated downwardly as at 26 and then upwardly as at 27 the purpose of which will hereinafter be described.

These angulated ends are manipulated through adjacent pairs of apertures 19 so that the arms 24 extend upon one side of the disc 17 with the cross piece 25 lying against the opposite side of the disc which is on the side of the end 12 of the spindle. It will be noted that the arms 24 of the scaling elements extend just beyond the periphery of the backing disc 21 so that the backing disc acts upon the disc 17 over the majority of its area.

The anchor element 14, in the embodiment shown in FIG. 1, includes a further apertured disc 28 freely engagable over spindle 10 and engaging against a nut or screw threaded element 29 which engages the other screw threaded portion 11A of the spindle. A centrally apertured holding disc 29 freely engages over the spindle 10 with the diameter of the central aperture 30 being somewhat larger than the diameter of the spindle 10 and the angulated ends 26 and 27 of the arms 24 engage through apertures within disc 28 which are similar to apertures 19 shown in disc 17. The angulated ends then extend inwardly towards the spindle 10, through the aperture 30 of the holding disc and then outwardly as clearly shown and a clamping disc 31 then engages over spindle 10 and bears against the end 27 of the scaling elememts 15. A further nut or screw threaded element 32 engages the distal end of the screw threaded portion 11A and may be used to clamp the ends 26 and 27 between the holding disc 29 and the further disc 28 with the positioning of nut 29 governing the position of the anchor element 14 and also the tension within the arms 24 of the scaling elements 15.

Figure 3:
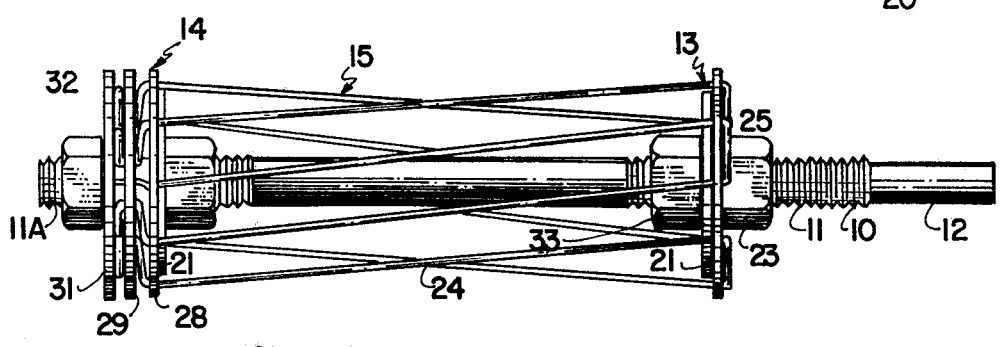
FIG. 3 is a view similar to FIG. 1, but showing the scaling elements in spiral relationship to the longitudinal axis.

The arms 24 of the scaling elements may either be in spaced and parallel relationship and straight, that is parallel to the longitudinal axis of the spindle 10 or, alternatively, may be spiralled leftwardly or rightwardly as illustrated in FIG. 3 by rotating the anchor elements 13 and 14 relative to one another and then locking them in position as hereinbefore described. The spiralling in either direction allows the device to be adjusted for use with either right or left handed persons.

FIG. 3 also shows a slightly alternative construction to FIG. 1 in which the backing disc 21 is apertured centrally and slips over the spindle 10 and is held in position by an outer lock nut or screw threaded element 33 with the inner lock nut 23 acting in a manner hereinbefore described with the disc 17 and the backing disc 21 being held between nuts 23 and 33.

Figure 8:
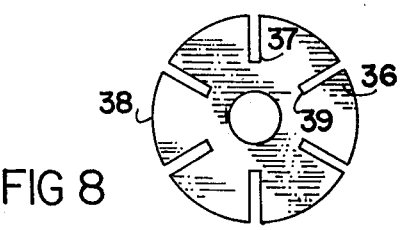
FIG. 8 is a front elevation of the holding disc of FIG. 5.

FIGS. 5, 8 and 9 show an alternative embodiment in which the scaling elements are in the form of the aforementioned blades 16. These are preferably formed from lengths of spring steel strip 34 of relatively thin guage and having angulated ends 35 formed thereon as clearly illustrated in FIG. 9.

Figure 10:
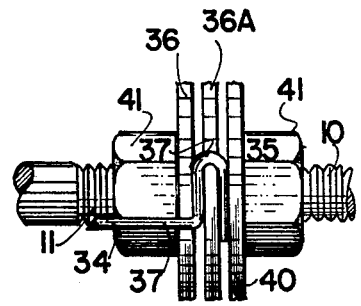
FIG. 10 is a fragmentary partially exploded elevation of a part of one of the anchor elements of FIG. 5.

The anchor elements 13A and 14A are similar to those hereinbefore described with the exception that the discs 17 and 28 are replaced by discs similar to that shown in FIG. 8 and illustrated by reference character 36. These discs are provided with radially extending slot 37 extending from the periphery 38 of the disc to a point 39 spaced inwardly therefrom and the portions 39 of the blade 16 slip into these discs with the end portions extending through further slotted discs 39A as shown in FIG. 10 to be clamped in position by clamping discs 40 held by nuts or screw threaded elements 41 engaging the screw threaded portions 11 and 11A of the spindle. Once again, the positioning of these anchor elements by means of adjustment of the nuts 41, not only clamps the blades 16 in position, but also tensions same to the desired amount. It will also be observed that these blades may lie parallel to the longitudinal axis or in a spiral position in a manner similar to that hereinbefore described for the previous embodiment.

In this particular embodiment, the edges 42 of the blades face outwardly inasmuch as the blades lie radially relative to the spindle so that a scraping action is provided rather than a cutting action.

In either case, the scales are readily and easily removed with minimum damage to the flesh of the fish. Furthermore, particularly with the embodiment illustrated and described relative to FIG. 1, the use of the device is relatively safe to the operator.

Since various modifications can be made in my invention as hereinabove described, and many apparently widely different embodiments of same made within the spirit and scope of the claims without departing from such spirit and scope, it is intended that all matter contained in the accompanying specificaton shall be interpreted as illustrative only and not in a limiting sense.

What I claim as my invention is:

1. A fish scaler comprising in combination a drive spindle attachable to a source of power for rotation; comprising in combination a pair of spaced apart anchor elements on said spindle, a plurality of scaling elements extending between and held by said anchor elements in cylindrical array, a screw threaded means cooperating between at least one of said anchor elements and said spindle to move said one anchor element length-wise on said spindle relative to the other anchor element, thereby controlling the tension in said scaling elements, at least one end of said scaling elements including a double angulated end portion having an inner angulated portion extending substantially at right angles to said scaling element and an outer angulated portion extending from the end of said inner angulated portion in substantially spaced and parallel relationship thereto, to form a substantially U-shaped end engaging said one of said anchor elememts, said anchor elements engaged by said outer angulated portion incuding a centrally apertured holding disc freely engaging over said spindle, means in said holding disc to receive said angulated portion of said scaling element whereby said inner angulated portion engages upon one side of said disc and said outer angulated portion engages upon the other side of said disc, a further centrally apertured disc freely engaging said spindle on the inner side of said holding disc and engaging against said inner angulated portion, said scaling elements engaging through said further disc, a centrally apertured clamping disc freely engaging said spindle on the outer side of said holding disc and engaging said outer angulated portion, and means cooperating between said spindle and said discs, upon either side of said discs, to clamp said discs together and hence clamp said inner and outer angulated portions between said holding disc and said further disc, and between said holding disc and said clamping disc, respectively.

2. The fish scaler according to claim 1 in which said other ends of said scaling element also include a double angulated end portion having an inner angulated portion extending substantially at right angles to said scaling element and an outer angulated portion extending from the end of said inner angulated portion in substantially spaced and parallel relationship thereto, to form a substantially U-shaped end engaging said other of said anchor elements, said other anchor element engaged by said other end of said scaling element also including a centrally apertured holding disc freely engaging over said spindle, means in said holding disc to receive said angulated portion of said scaling element whereby said inner angulated portion engages upon one side of said disc and said outer angulated portion engages upon the other side of said disc, a further centrally apertured disc freely engaging said spindle on the inner side of holding disc and against said inner angulated portion, said scaling elements engaging through said further disc, a centrally apertured clamping disc freely engaging said spindle on the outer side of said holding disc and engaging said outer angulated portion, and means cooperating with said spindle upon either side of said discs to clamp said disc together and hence clamp said inner and outer angulated portions between said holding disc and said further disc, and between said holding disc and said clamping disc, respectively.

3. The fish scaler according to claim 1 in which said scaling element comprises elongated blades situated in radial relationship with said spindle, said further disc and said clamping disc including radially extending slots extending from the periphery thereof towards the center thereof, said angulated ends of said blades engaging one of said slots.

4. The fish scaler according to claim 2 in which said scaling element comprises elongated blades situated in radial relationship with said spindle, said further disc and said clamping disc including radially extending slots extending from the periphery thereof towards the center thereof, said angulated ends of said blades engaging one of said slots.

5. The fish scaler according to claim 1 in which said scaling elements each comprise a length of wire formed with two spaced and parallel arms and a cross piece, said arms extending from each end of said cross piece, the distal ends of said arms being double angulated, the other of said anchor elements including a centrally apertured disc on said spindle, pairs of apertures formed through said disc adjacent the periphery thereof, said arms extending through adjacent pairs of apertures with the cross piece lying against the side of the disc opposite to the side on which said arms extend, and a backing disc on said spindle engaging against said last mentioned centrally apertured disc to supply rigidity thereto, said further disc and said clamping disc also including pairs of apertures adjacent the periphery thereof, said arms extending through adjacent pairs of apertures in said further disc, said double angulated ends of said arms extending through adjacent pairs of apertures in said holding disc.

6. The fish scale according to claim 2 in which said scaling elements each comprise a length of wire formed with two spaced and parallel arms and a cross piece, said arms extending from each end of said cross piece, The distal ends of said arms being double angulated, the other of said anchor elements including a centrally apertured disc on said spindle, pairs of apertures formed through said disc adjacent the periphery thereof, said arms extending through adjacent pairs of apertures with the cross piece lying against the side of the disc opposite to the side on which said arms extend, and a backing disc on said spindle engaging against said last mentioned centrally apertured disc to supply rigidity thereto, said further disc and said clamping disc also including pairs of apertures adjacent the periphery thereof, said arms extending through adjacent pairs of apertures in said further disc, said double angulated ends of said arms extending through adjacent pairs of apertures in said holding disc.

7. The fish scaler according to claims 1, 2 or 3 in which said screw threaded means cooperating between at least one anchor element and said spindle, includes a screw threaded portion on said spindle adjacent said one anchor element, an inner nut screw threadably engaging said screw threaded portion, said further disc engaging against said inner nut, an outer nut screw threadably engaging said screw threaded portion and engaging against said clamping disc, said at least one anchor element being selectively and partially rotatable upon said spindle to move said scaling elements from a spaced and parallel relationship with one another parallel to the longitudinal axis of said spindle, to a spaced and parallel spiral relationship relative to the longitudinal axis of said spindle, said inner and outer nuts detachably holding said scaling elements in the desired position when tightened against said further disc and said clamping disc as aforesaid.

8. The fish scaler according to claims 4, 5 or 6 in which said screw threaded means cooperating between at least one anchor element and said spindle, includes a screw threaded portion on said spindle adjacent said one anchor element, an inner nut screw threadably engaging said screw threaded portion, said further disc engaging against said inner nut, an outer nut screw threadably engaging said screw threaded portion and engaging against said clamping disc, said at least one anchor element being selectively and partially rotatable upon said spindle to move said scaling elements from a spaced and parallel relationship with one another parallel to the longitudinal axis of said spindle, to a spaced and parallel spiral relationship relative to the longitudinal axis of said spindle, said inner and outer nuts detachably holding said scaling elements in the desired position when tightened against said further disc and said clamping as aforesaid.

* * * * *